(12) United States Patent
Koakutsu et al.

(10) Patent No.: US 7,190,821 B2
(45) Date of Patent: *Mar. 13, 2007

(54) NEGOTIABLE INSTRUMENT PROCESSING APPARATUS

(75) Inventors: Naohiko Koakutsu, Suwa (JP); Yukihiro Okamura, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/326,815

(22) Filed: Jan. 6, 2006

(65) Prior Publication Data

US 2006/0115141 A1    Jun. 1, 2006

Related U.S. Application Data

(62) Division of application No. 10/175,941, filed on Jun. 19, 2002, now Pat. No. 7,010,155.

(30) Foreign Application Priority Data

Oct. 10, 2001    (JP) .............................. 2001-312947

(51) Int. Cl.
    *G06K 9/36*    (2006.01)
(52) U.S. Cl. ...................... 382/137; 382/270; 382/318
(58) Field of Classification Search ................ 382/137, 382/138, 139, 140, 172, 176, 270, 271, 272, 382/318, 319
    See application file for complete search history.

(56) References Cited

U.S. PATENT DOCUMENTS

| 5,809,167 A | 9/1998 | Al-Hussein ................. 382/190 |
| 5,848,182 A | 12/1998 | Kanamori .................... 382/171 |
| 5,889,885 A | 3/1999 | Moed et al. ................. 382/172 |
| 5,953,450 A | 9/1999 | Kanamori .................... 382/171 |
| 6,064,762 A | 5/2000 | Haenel ........................ 382/171 |
| 6,301,386 B1 | 10/2001 | Zhu et al. ................... 382/176 |
| 6,351,566 B1 | 2/2002 | Zlotnick ..................... 382/237 |
| 6,411,737 B2 | 6/2002 | Wesolkowski et al. ..... 382/237 |

(Continued)

FOREIGN PATENT DOCUMENTS

EP    0 677 817 A2    10/1995

(Continued)

*Primary Examiner*—Andrew W. Johns
(74) *Attorney, Agent, or Firm*—Mark P. Watson

(57) ABSTRACT

An apparatus and a method for processing checks and other negotiable instruments efficiently captures MICR data required for electronic payment and an image of the check or negotiable instrument enabling the amount, payee, and other information printed or written on the check face to be clearly read. The image reading unit 11 of the check processing apparatus 110 scans and outputs a gray scale image of the check. A threshold value determination unit 12 sets a threshold value for digitizing the image data based on the density level frequency distribution of primary gray scale image data obtained by the image data reading unit scanning a first scanning area T. This first scanning area contains part of a printed text area 127 where text is printed on the negotiable instrument and part of the background 49 of the negotiable instrument. A digital image processor 20 digitizes and converts secondary gray scale image data to digital image data based on the threshold value set by the threshold value determination unit 12. The secondary gray scale image data is generated by the image reading unit 11 scanning a predefined second scanning area of the negotiable instrument.

20 Claims, 18 Drawing Sheets

U.S. PATENT DOCUMENTS

| | | | |
|---|---|---|---|
| 6,507,670 B1 | 1/2003 | Moed | 382/172 |
| 6,792,133 B2 | 9/2004 | Ott et al. | 382/112 |
| 7,010,155 B2 * | 3/2006 | Koakutsu et al. | 382/137 |

FOREIGN PATENT DOCUMENTS

| | | |
|---|---|---|
| JP | 01173973 A | 7/1989 |
| JP | 02177668 A | 7/1990 |
| JP | 6-30264 A | 2/1994 |
| JP | 7-273996 A | 10/1995 |
| JP | 8-50633 A | 2/1996 |
| JP | 8-204963 A | 8/1996 |
| JP | 11-112796 A | 4/1999 |
| JP | 2001-86331 A | 3/2001 |
| JP | 2001134702 A | 5/2001 |

* cited by examiner

NEGOTIABLE INSTRUMENT PROCESSING APPARATUS

CONTINUING APPLICATION DATA

This application is a divisional of application No. 10/175,941 filed Jun. 19, 2002, now U.S. Pat. No. 7,010,155. The contents of this prior application are incorporated herein by reference in its entirety.

RELATED APPLICATIONS

Japanese patent application No.(s) 2001-312947, is hereby incorporated by reference in its/their entirety.

BACKGROUND OF THE INVENTION

1. Field of the Invention

This invention relates to an apparatus and a method for capturing images of negotiable instruments such as checks used for settling transactions.

2. Description of the Related Art

Checks and other such negotiable instruments are widely used to settle commercial transactions and to pay for purchases in stores and restaurants. This payment process is described below using checks by way of example. An account number and related information is generally printed on the face of a check as magnetic ink character data (MICR) enabling the account information to be read automatically for verification with the financial institution.

When a check is used for payment in a retail store, for example, the payee, date, and amount are printed on the face of the check after the check is verified, and the verification number, date, amount, and other endorsement information is automatically printed on the back of the check using a printer. After the store has finished processing the check, the check is typically delivered to the bank or other financial institution where the final payment process (check clearing) is completed. Electronic payment has been promoted in recent years as a way to increase the efficiency of the payment process by electronically sending the transaction data and images of the printed front and back of the check to the financial institution.

Checks, however, normally have a background pattern on the front of the check, and if the check image is captured at low resolution it can be difficult to read the printed text information, including the account number, payee, date, and amount. If the scanned images are captured at high resolution or color images are captured, however, the time required for the scanning process is undesirably long. High resolution and color also greatly increase the size of the image data, making large capacity, high speed storage devices necessary for storing the image data and requiring more time to transmit the scanned image data to the financial institution.

OBJECTS OF THE INVENTION

An object of our invention is therefore to provide a negotiable instrument processing apparatus and method for efficiently capturing image data from a check or other negotiable instrument, and for effectively differentiating the magnetic ink character data required for electronic payment and printed data on the front of the check from background printing or other marks or information on the check.

SUMMARY OF THE INVENTION

To achieve this and other objects, a negotiable instrument processing apparatus according to the present invention has an image reading unit for scanning a negotiable instrument and outputting gray scale image data; a threshold value determination unit for setting a threshold value for digitizing gray scale image data based on a density level frequency distribution in primary gray scale image data obtained by the image data reading unit scanning a first scanning area; and a digital conversion processing unit for digitizing and converting secondary gray scale image data to digital image data based on the threshold value set by the threshold value determination unit. The first scanning area contains part of a printed text area where text is printed on the negotiable instrument and part of the background of the negotiable instrument. The secondary gray scale image data obtained by the image reading unit scans a predefined second scanning area of the negotiable instrument.

Our invention therefore dynamically sets a threshold value used to convert a gray scale image of a check or other negotiable instrument to digital image data based on a part of the image considered characteristic of image features in the check or other negotiable instrument. It is therefore possible to obtain digital image data from which text information can be accurately determined and read.

The first scanning area preferably includes a first area containing a part of the printed text area and a second area containing a part of the background, and the first and second areas are noncontiguous. The required memory capacity and processing time required to determine the threshold value can thus be reduced.

Further preferably, the second area includes multiple sections each containing part of the background. This enables the threshold value to be appropriately determined even if the background of the check or negotiable instrument is mottled (not of uniform density).

Yet further preferably, the threshold value determination unit determines the threshold value based on a density level frequency distribution after weighting scale data in the first area. Thus, emphasizing data in the area where text is known to exist enhances the density values detected in the text area and makes it possible to set an appropriate threshold value.

Yet further preferably, the printed text area is a magnetic ink character printing area where magnetic ink characters are printed. In this case, the negotiable instrument processing apparatus also has a magnetic head for reading magnetic ink characters, and the threshold value determination unit detects the magnetic ink character printing area based on output signals from the magnetic head, and sets the first scanning area based on said magnetic ink character printing area. This makes it possible to appropriately set the first scanning area.

Further preferably, the threshold value determination unit averages the density level frequency distribution and determines the threshold value based on the averaged density level frequency distribution. This averaging process removes noise, and thus enables accurate extracting the features of the density level frequency distribution.

Yet further preferably, the threshold value set by the threshold value determination unit is a lightness value for generating the digital image data so that the text is readable, but the background is substantially removed. Yet further preferably, the threshold value determination unit identifies a peak representing the text and an adjacent peak representing the background in the density level frequency distribution, and sets the threshold value between the peaks.

Our invention is also a method for processing checks and other such negotiable instruments. The method of our invention achieves the same effects and benefits described herein.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
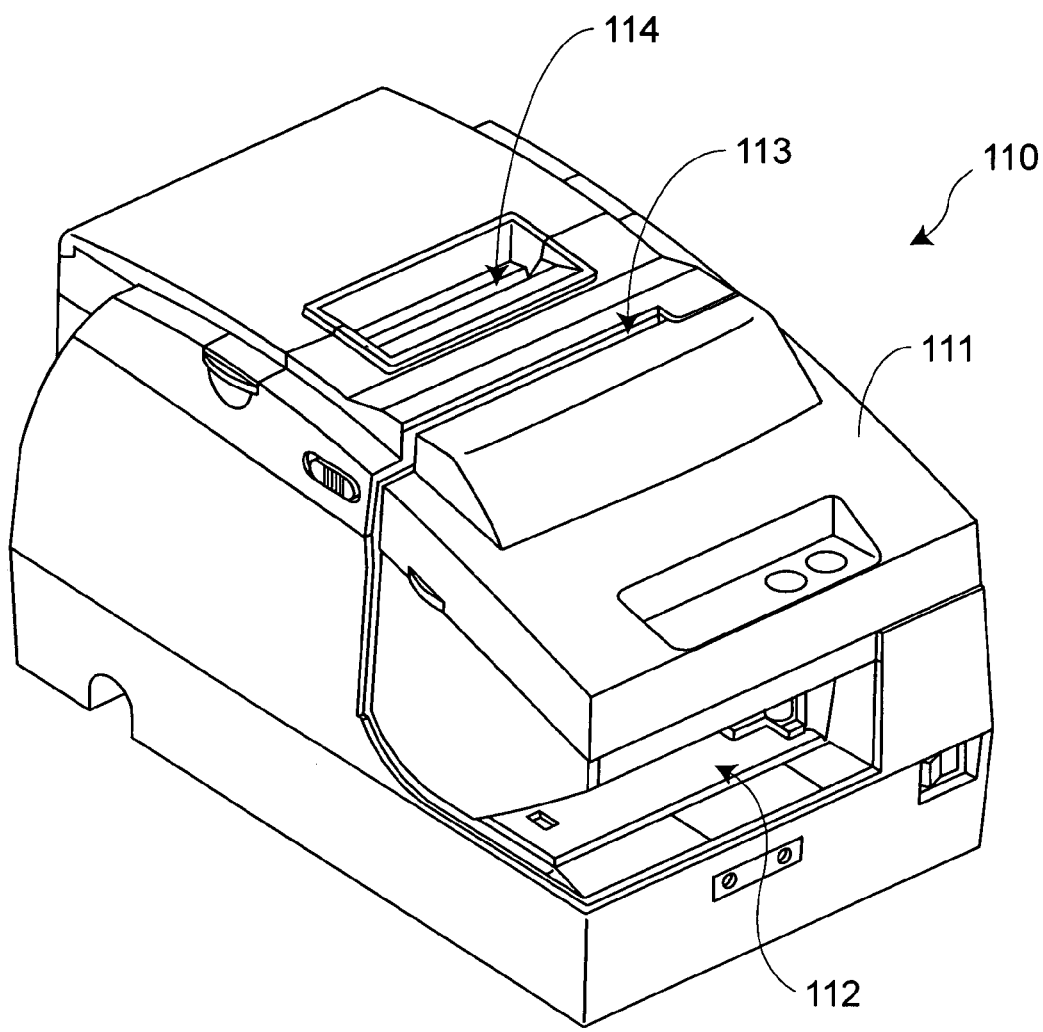
FIG. 1 is a perspective view of a check processing apparatus according to a preferred embodiment of this invention.

A preferred embodiment of the present invention is described below with reference to the accompanying figures. FIG. 1 is a perspective view of a check processing apparatus according to a preferred embodiment of this invention. As shown in the figure the check processing apparatus 110 is covered by a plastic cover 111, has an insertion opening 112 at the front for manually inserting a check, and has a check exit 113 from which the check is ejected from the top. This check processing apparatus 110 also has a roll paper housing unit (not shown in the figure) for storing roll paper at the back part. Roll paper is stored in the roll paper housing unit, pulled therefrom, passed through the printing unit, and ejected from a roll paper exit 114 in the top of the check processing apparatus.

Figure 2:
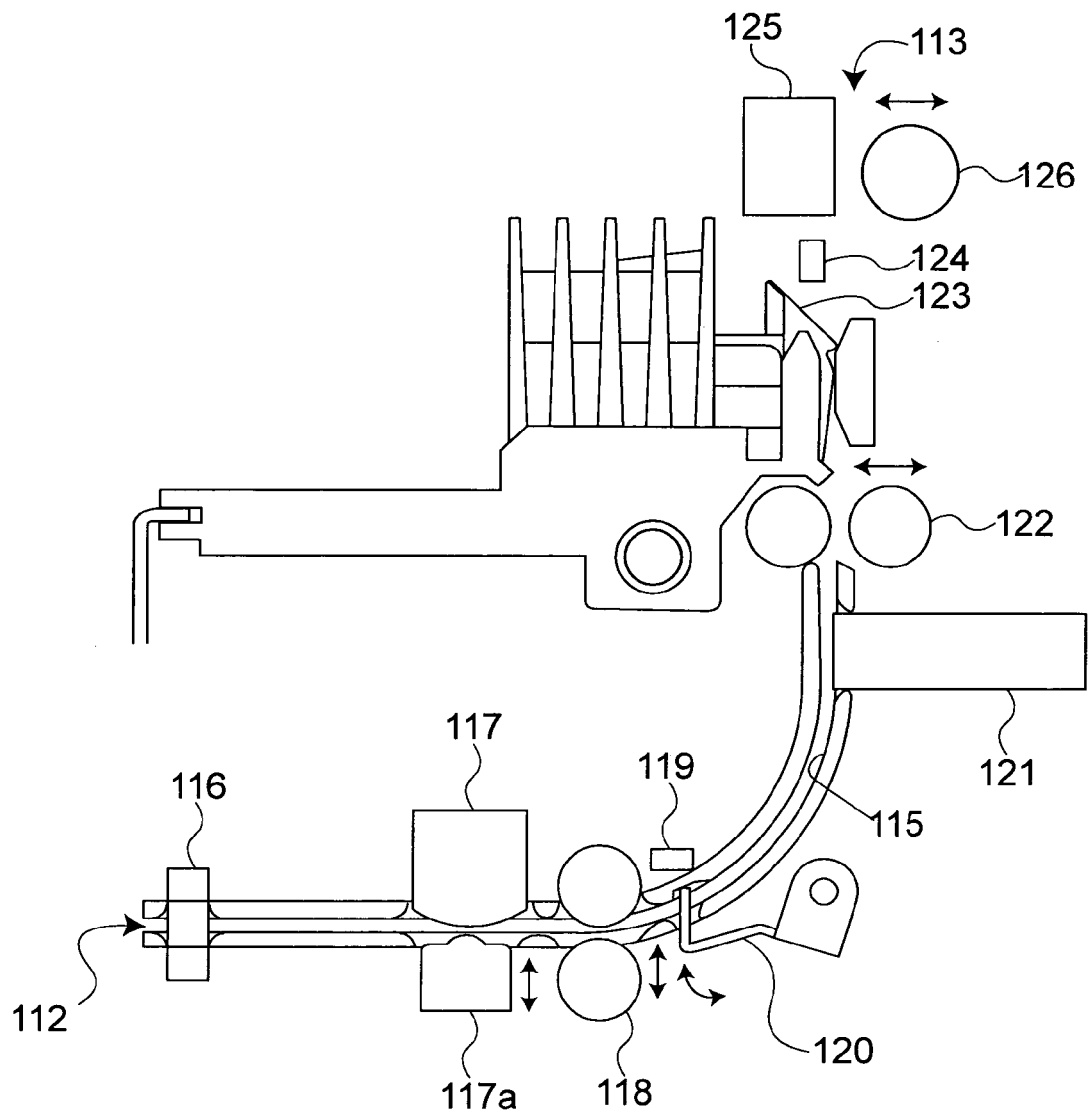
FIG. 2 is a side sectional view showing the internal structure of the check processing apparatus.

FIG. 2 is a side sectional view showing the internal structure of the check processing apparatus. As shown in FIG. 2 a check transportation path 115 is formed inside the check processing apparatus 110 and extends from the insertion opening 112 to the check exit 113. When seen from the side, the check transportation path 115 curves in an L-shape with the insertion opening 112 side horizontally oriented and the check exit 113 side vertically oriented. Positioned along the check transportation path 115 in order from the insertion opening 112 side are a form trailing edge detector 116, magnetic head 117, first feed roller pair 118, form leading edge detector 119, form positioning member 120, back print head 121, second feed roller pair 122, front print head 123, form ejection detector 124, scanner 125, and scanner feed roller 126 opposite the scanner 125.

The form trailing edge detector 116, form leading edge detector 119, and form ejection detector 124 are, for example, transmitting or reflecting type photodetectors enabling non-contact detection of the presence of a check at various positions along the check transportation path 115.

The form positioning member 120 temporarily stops a check inserted from the insertion opening 112 at a specific position, and is configured so that it can be changed by driving a solenoid or other type of actuator between a position where the actuator projects into and closes the check transportation path 115 and a position where the actuator is retracted from and opens the check transportation path 115.

The first feed roller pair 118 and second feed roller pair 122 are pairs of roller members positioned so that the rollers of each pair are on opposite sides of the check transportation path 115. A check can be transported in forward and reverse directions by appropriately driving one of the rollers. One roller in each pair can also be freely retracted from or advanced toward the other roller member so that the check transportation path 115 can be opened or closed by driving a solenoid or other actuator to appropriately retract or advance the rollers.

Figure 3:
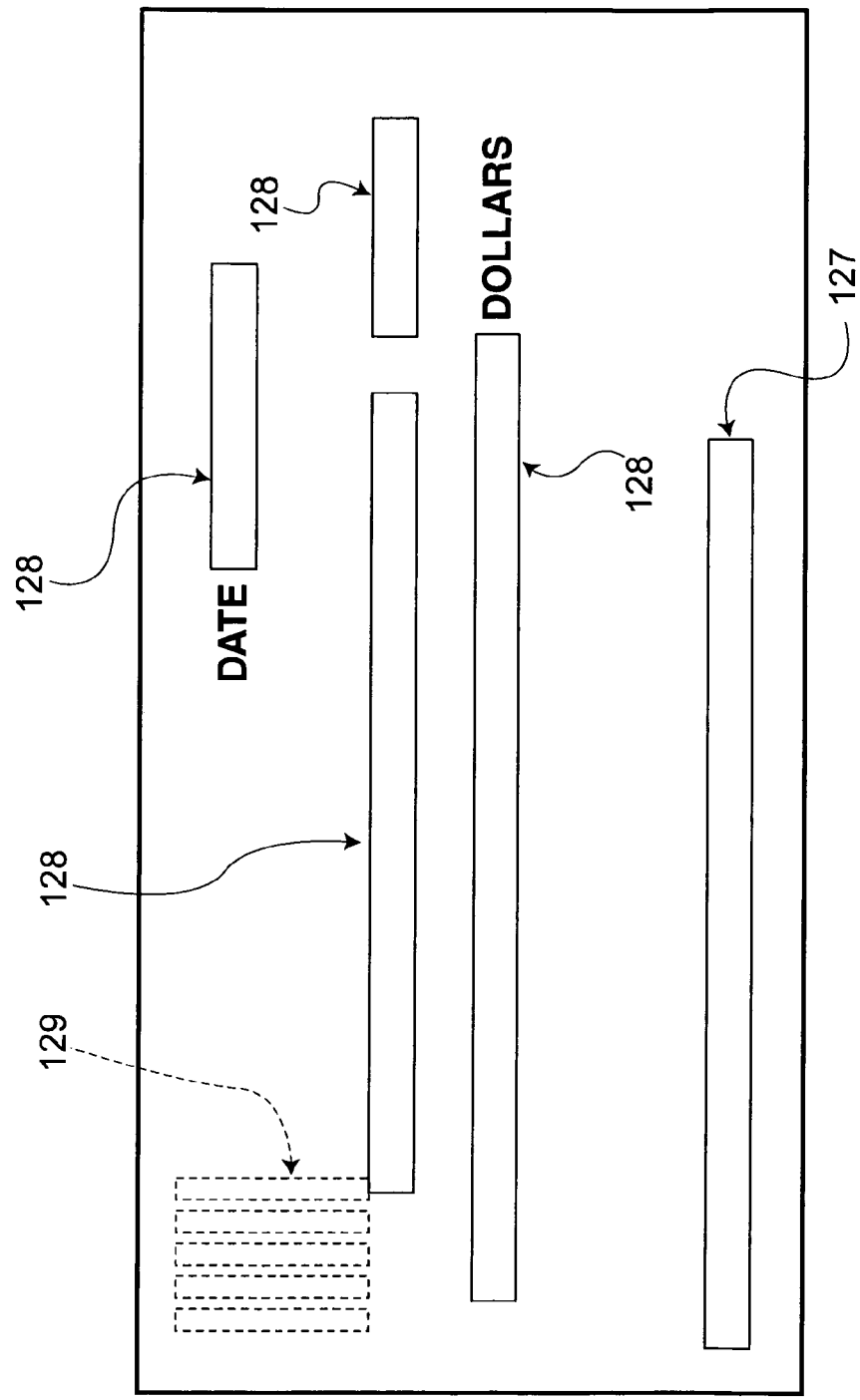
FIG. 3 shows the layout of a typical check.

The magnetic head 117 is used to read the magnetic ink characters printed on the check face. Whether a check is valid or not is determined based on the data read by the magnetic head 117. As shown in FIG. 3, the magnetic ink characters are printed in a specific magnetic ink character recording area 127 on the front of the check, and record the checking account number and other information. A pressure member 117a for pressing a check against the magnetic head 117 for magnetic ink character reading is positioned opposite the magnetic head 117, but is normally retracted from the magnetic head 117 so that the check transportation path 115 is open during all operations other than magnetic ink character reading.

The front print head 123 is used for printing the payee, date, amount, and other check face data on the front of the check. This data is printed on the face printing areas 128 shown in FIG. 3. The front print head 123 is a serial print head supported on a carriage for printing a dot matrix of one or multiple columns while travelling widthwise over the check. A dot impact type print head for transferring ink from an ink ribbon to the check is used as the front print head 123 in this preferred embodiment, but other types of print heads can alternately be used.

The back print head 121 is used for printing a customer verification number, date, amount, and other information required for endorsement by the store on the back of the check. This endorsement data is printed on an endorsement printing area 129 as shown in phantom in FIG. 3. The back print head 121 is a shuttle head having multiple heads spaced at specific intervals widthwise to the check, each head printing a dot matrix of one or more columns by movement of the head within the width of this specific interval. A dot impact type print head for transferring ink from an ink ribbon to the check is used as the back print head 121 in this preferred embodiment of the invention, but other types of heads can alternately be used.

The scanner 125 scans the face of a printed check. The scanned image data is sent to and stored in a host computer 200 (FIG. 4) and used for electronic payments and electronic payment verification. The scanner 125 in this embodiment is a contact image sensor (CIS) capable of generating a 256-level gray scale image, and scans with the check pressed against the scanning surface thereof.

The scanner feed roller 126 transports the check for the scanning operation, and presses the check against the scanning surface of the scanner 125 while transporting it toward the check exit 113. When not scanning, the scanner feed roller 126 retracts from the scanner 125 so that the check transportation path 115 is open. During the scanning operation the check is transported upward by the scanner feed roller 126 while the scanner 125 scans the check, and the check is then ejected from check exit 113. After the check is transported to the scanning start position by the first feed roller pair 118 and second feed roller pair 122 in the scanning operation, retraction of the scanner feed roller 126 is cancelled so that the check is pressed against the scanner 125 while the scanner feed roller 126 is driven to transport the check over the scanner 125 surface while it is scanned.

Figure 4:
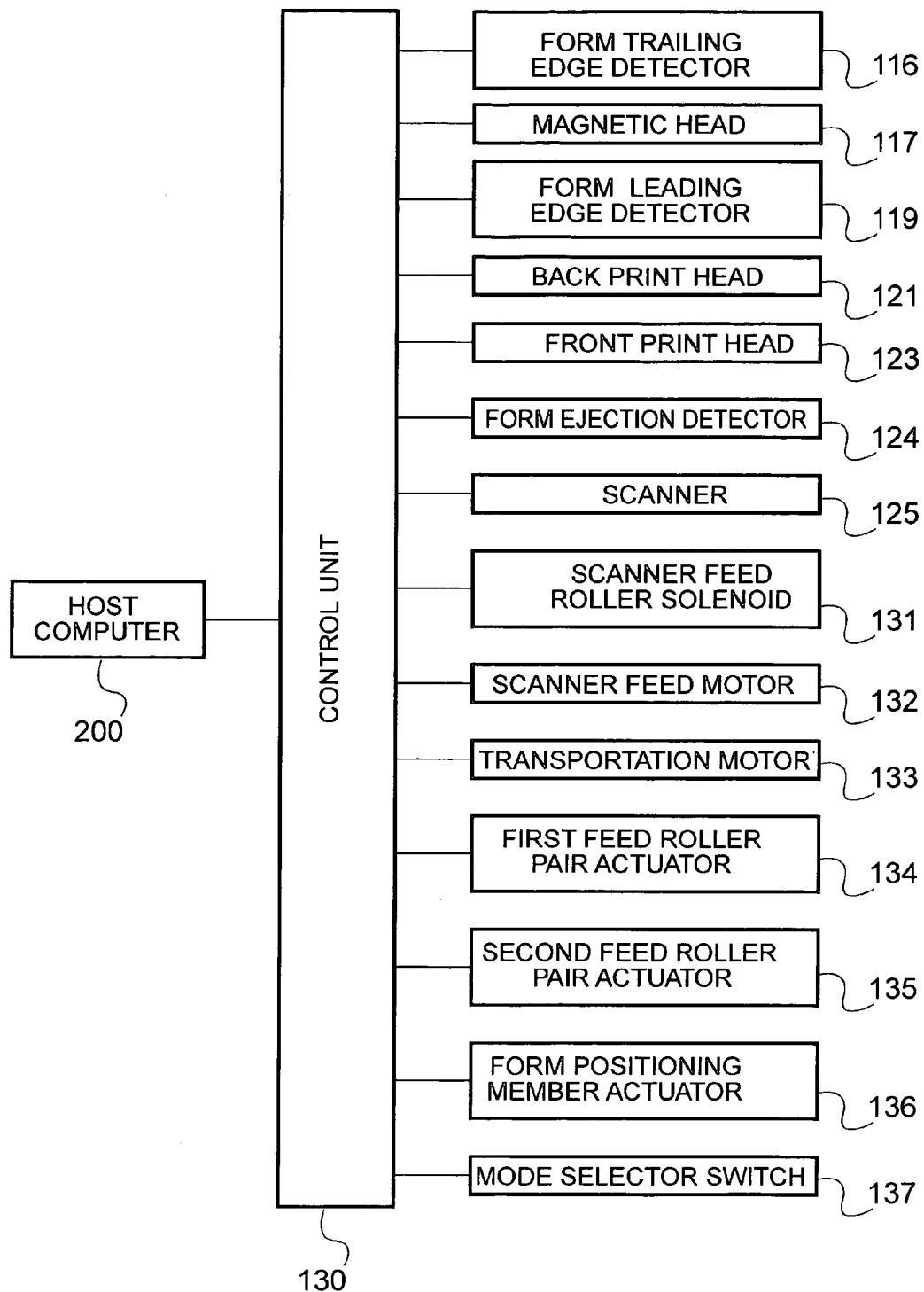
FIG. 4 is a block diagram of the controller inputs and outputs.

FIG. 4 is a block diagram of the controller inputs and outputs. As shown in FIG. 4, the check processing apparatus 110 has a control unit 130 comprising a CPU, ROM, RAM, and other devices. In addition to the above-described trailing edge detector 116, magnetic head 117, leading edge detector 119, back print head 121, front print head 123, form ejection detector 124, and scanner 125, the control unit 130 controls a scanner feed roller solenoid 131 for moving the scanner feed roller 126 to open and close the form transportation path; a scanner feed motor 132 for driving the scanner feed roller 126; a transportation motor 133 for driving the first feed roller pair 118 and second feed roller pair 122; first feed roller pair actuator 134 for opening and closing the first feed roller pair 118; second feed roller pair actuator 135 for opening and closing the second feed roller pair 122; form positioning member actuator 136 for moving the form positioning member 120 to opened and closed positions; and mode selector switch 137 for selecting a first process control mode (with scanning) or a second process control mode (without scanning). The control sequence of the first process control mode run by the control unit 130 is described below.

Figure 5:
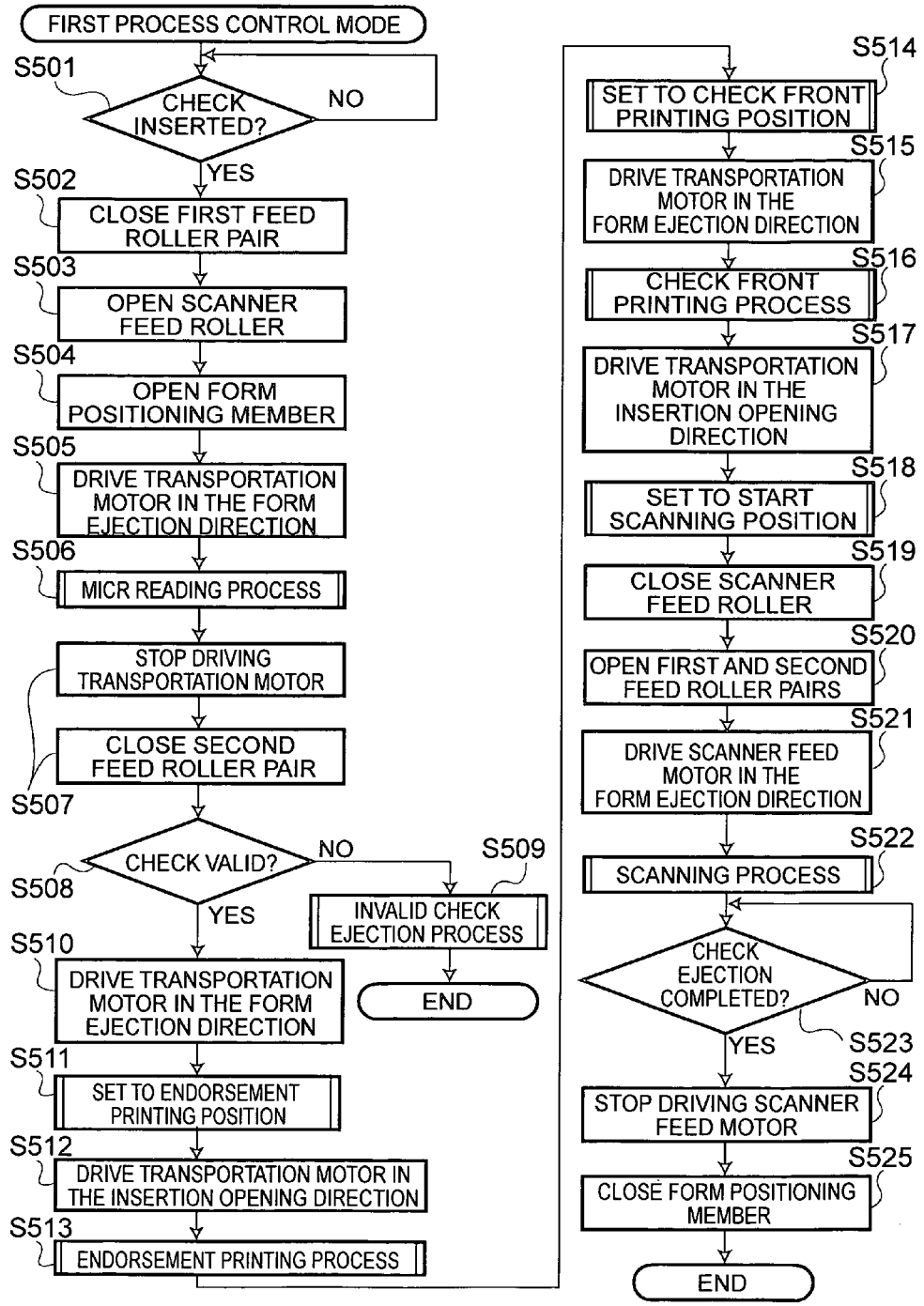
FIG. 5 is a flow chart showing the control sequence of the first process control mode.
Figure 6:
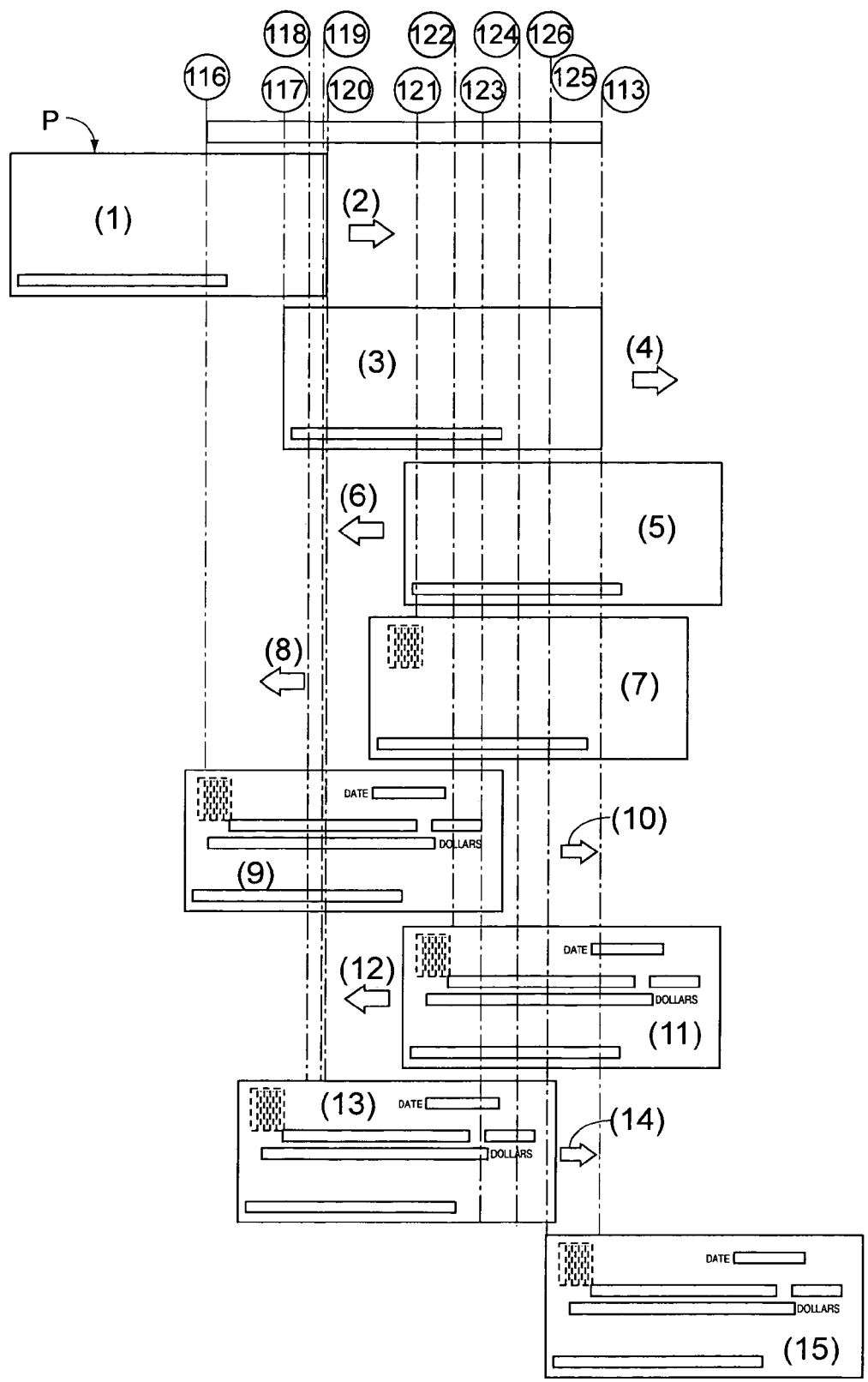
FIG. 6 illustrates operation in the first process control mode.

FIG. 5 is a flow chart showing the control sequence of the first process control mode, and FIG. 6 illustrates operation in the first process control mode. It should be noted that the numbers in circles shown in FIG. 6 correspond to the parts of the same numbers shown in FIG. 2, and indicate the position of those parts relative to a check P in the check transportation path 115.

As shown in the figures, the first step in the first process control mode is to wait for insertion of a check P (S501). During this time the first and second feed roller pairs 118, 122 are held open, and the form positioning member 120 and scanner feed roller 126 are held closed. Note that if operation was previously in the second process control mode, the scanner feed roller 126 is open.

When a check P is inserted from insertion opening 112, check insertion is detected from the detection signals output by trailing edge detector 116 and leading edge detector 119 (FIG. 6 (1)). When check insertion is detected, the first feed roller pair 118 closes (S502), the scanner feed roller 126 opens (S503), and the form positioning member 120 opens (S504). MICR text is then read with the magnetic head 117 (S506, FIG. 6 (2), (3)) while driving the transportation motor 133 in the form ejection direction (S505). After MICR reading, driving the transportation motor 133 stops (S507) and the second feed roller pair 122 closes. The data read with the magnetic head 117 is sent to a host computer for check verification. When the verification result is received from the host computer the result is evaluated (S508). If the check is invalid, an invalid check ejection process (S509) is run and the first process control mode ends.

If the check is valid, the transportation motor 166 is driven in the form ejection direction (S510) to set the check for endorsement printing on the check back (S511, FIG. 6 (4), (5)). The check is set to the endorsement printing position and to other various positions noted below by driving the transportation motor 133 a specified number of steps referenced to positions detected by the detectors 116, 119, 124 (including stopping form transport). When positioning for endorsement printing is completed the transportation motor 133 is driven in the insertion opening 112 direction (S512) while running the endorsement printing process with the back print head 121 (S513, FIG. 6 (6), (7)).

When endorsement printing is completed, the check is set to the front printing position (S514, FIG. 6 (8), (9)), and then, while driving the transportation motor 133 in the form ejection direction (S515) the front of the check is printed using the front print head 123 (S516, FIG. 6 (10), (11)).

When the check front printing process is completed the transportation motor 133 is again driven in the insertion opening 112 direction (S517) to set the check to the start scanning position (S518, FIG. 6 (12), (13)). The scanner feed roller 126 is then closed (S519), and the first and second feed roller pairs 118, 122 are opened (S520). The scanning process (S522, FIG. 6 (14)) is then run while driving the scanner feed motor 132 in the form ejection direction (S521). The scanning process is described in detail further below.

A check ejection decision (S523) is then made after the scanning process ends. If the check was ejected (FIG. 6 (15)), driving the scanner feed motor 132 stops (S524), the form positioning member 120 is closed (S525), and the first process control mode ends.

It should be noted that by controlling the transportation motor 133 synchronized to the scanner feed speed in the first process control mode, the check can be transported to the end of the scanning process with the first and second feed roller pairs 118, 122 closed.

As noted above, the second process control mode differs from the first process control mode in that the scanning process is not run in the second process control mode. More specifically, the check continues to be transported toward the exit in the second process control mode after the check front printing process ends, and check ejection is evaluated. Driving the transportation motor 133 stops and the form positioning member 120 is set to the closed position when it is determined that the check has been ejected. Removal of the check is then determined based on a detection signal from the form ejection detector 124, and the first second roller pairs 118, 122 are opened and the second process control mode ends when it is determined that the check has been removed.

Figure 7:
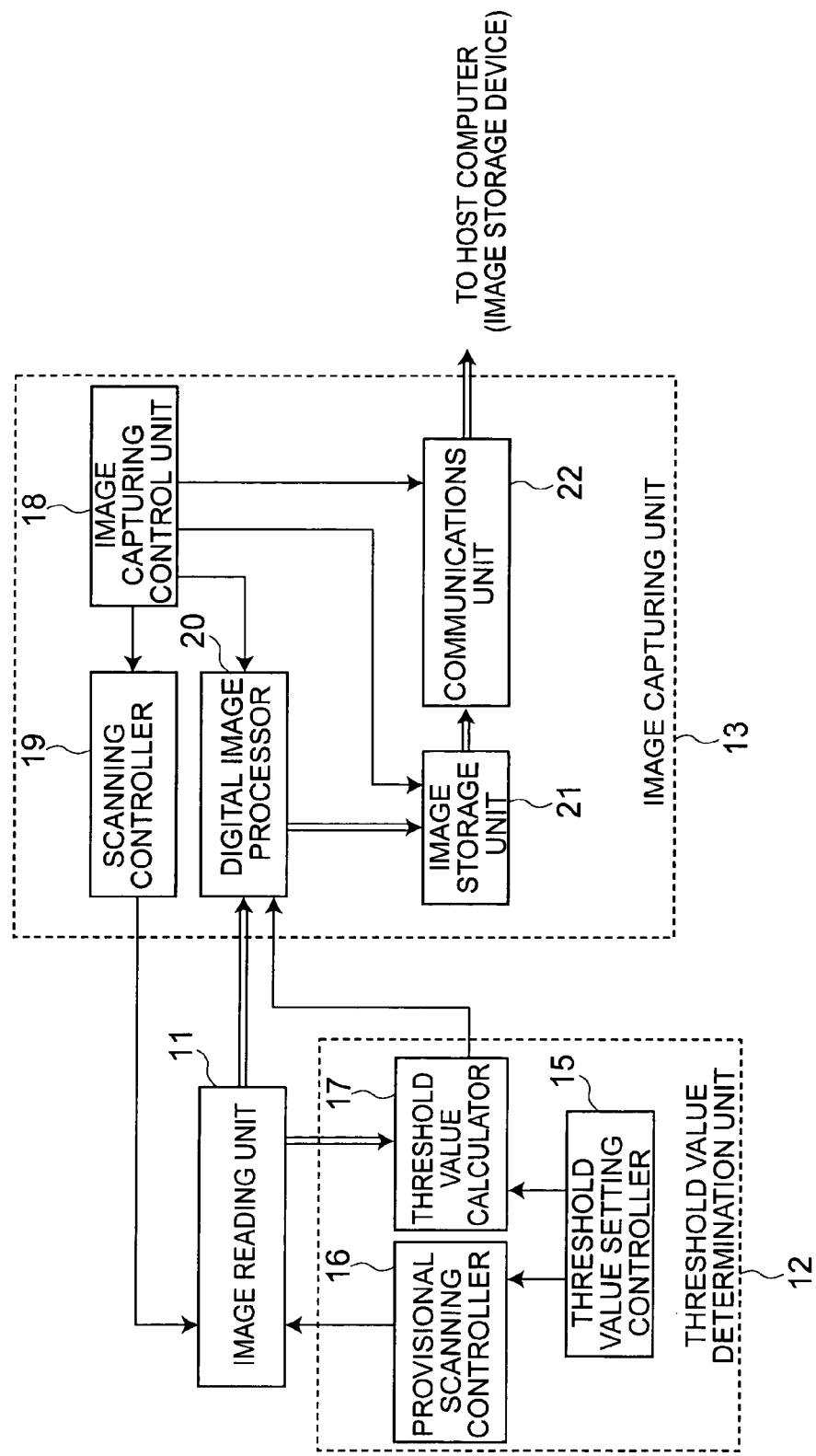
FIG. 7 is a function block diagram related to the scanning operation of the control unit.

FIG. 7 is a function block diagram related to the scanning operation of the control unit 130. The control unit 130 has a threshold value determination unit 12 and an image capturing unit 13, and controls an image reading unit 11 to scan a check. The image reading unit 11 includes the above-noted scanner 125, scanner feed roller 126, scanner feed roller solenoid 131, and scanner feed motor 132.

The threshold value determination unit 12 calculates and sets the threshold value needed for the digitizing (binarization) process that generates the digital (binary) image data from the 256-level gray scale image data by using a provisional scanning controller 16 and threshold value calculator 17 under the control of a threshold value setting controller 15.

It should be noted that the image data that results from scanning is referred to herein as gray scale image data, meaning that the density of each sample is being expressed with some number of bits per sample, which is the precision of the sample. One example used herein is 256-level gray scale, which is 8-bit precision, but 4-bit, 10-bit or other bit precision could also be used. In the example used herein with 256-level gray scale, the value 0 represents maximum darkness and the value 255 represents maximum lightness.

The image capturing unit 13 generates and sends digital image data to the host computer by digitizing the gray scale image data using scanning controller 19, digital image processor 20, image storage unit 21, and communications unit 22, under the control of image capturing control unit 18.

Figure 8:
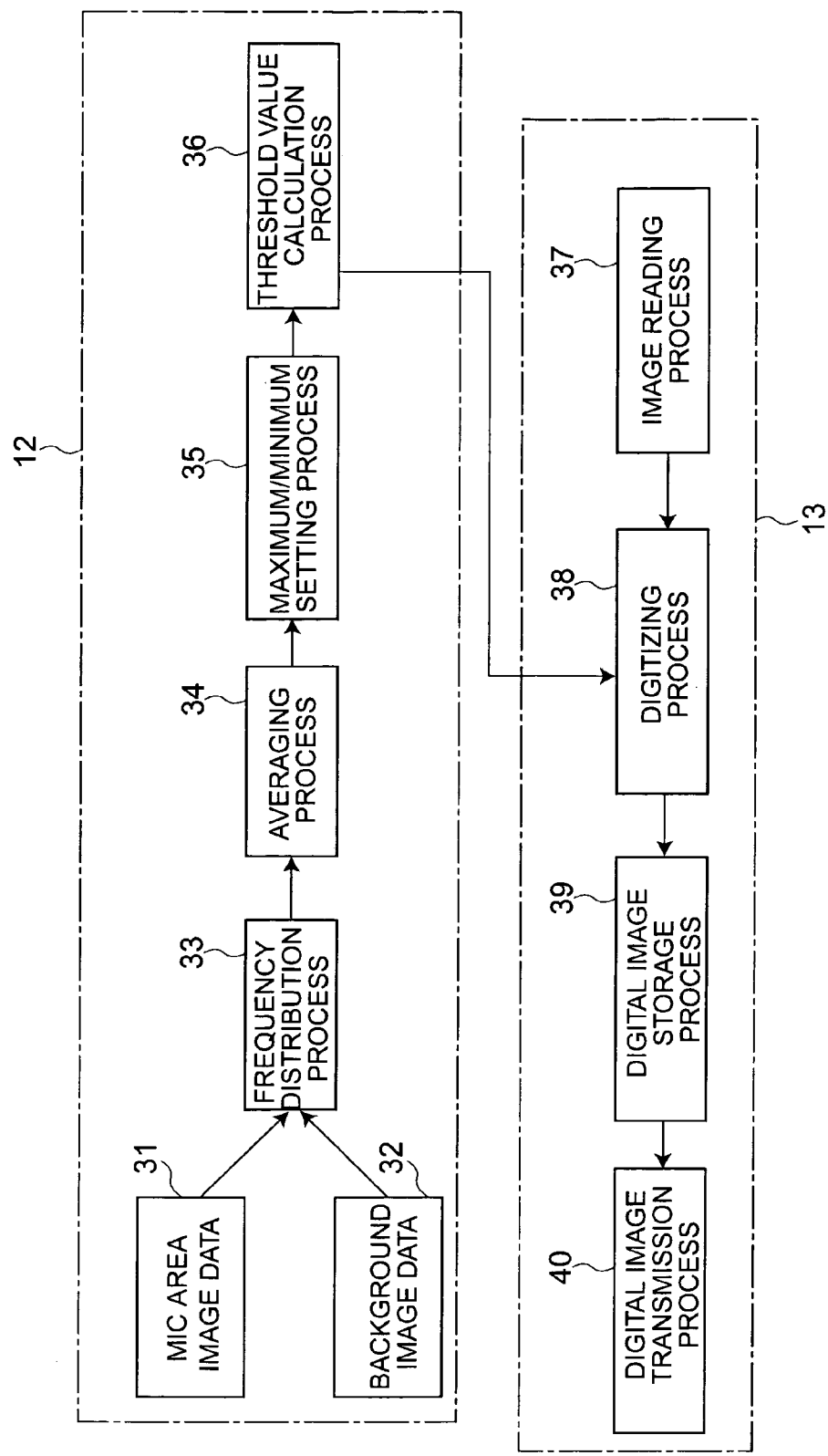
FIG. 8 is a block diagram of the threshold value setting process and the image capturing process.

FIG. 8 is a block diagram of the threshold value setting process of the threshold value determination unit 12 and the image capturing process of the image capturing unit 13. The provisional scanning controller 16 drives and controls the image reading unit 11 to scan and capture part of the check (referred to as provisional scanning area T) using the scanner 125. A frequency distribution process 33 is applied by the threshold value calculator 17 to the gray scale image data obtained from provisional scanning area T of the check by the provisional scanning controller 16; this image data is referred to below as the MIC area image data 31 and background image data 32. This frequency distribution process generates a histogram (a frequency distribution of the number of pixels of each density (gray) level) of image density from the 256-level gray scale data. The threshold value calculator 17 then applies an averaging process 34 to the histogram generated by the frequency distribution process 33 to remove noise and extract (sharpen) image features. The threshold value calculator 17 then runs a maximum/minimum setting process 35 to determine the maximum and minimum threshold values based on the histogram after the averaging process 34, and runs a threshold value calculation process 36 to determine an appropriate threshold value within the range defined by these maximum and minimum values. It should be noted that the threshold values determined by the threshold value calculator 17 can be stored in the threshold value determination unit 12 and read by the digital image processor 20 as needed, or they can be stored in the digital image processor 20.

Once the threshold values are determined, the scanning controller 19 controls and drives the image reading unit 11 to run an image reading process 37 for scanning and capturing the entire face side of the printed check using the scanner 125. It is also possible to scan and capture a predefined area including at least both the magnetic ink character recording area 127 and the face printing areas 128 instead of scanning the entire front of the check.

The digital image processor 20 then converts the gray scale image data captured by the image reading process 37 of the scanning controller 19 to digital image data by applying a digitizing process 38 to each pixel based on the threshold values determined by the threshold value determination unit 12.

The image storage unit 21 then runs a digital image storage process 39 to temporarily store the digital image data generated by the digitizing process 38 of the digital image processor 20, and the communications unit 22 runs a digital image transmission process 40 to send the temporarily stored digital image data to the host computer. It is, of course, also possible to send the digital image data directly to the host computer instead of providing an image storage unit 21 and digital image storage process 39.

The host computer stores the received digital image data with the electronic payment data in a searchable format in the image storage device of the host computer. The digital image data can also be compressed by the check processing apparatus 110 or the host computer. When processing and verifying an electronic payment, the payment clearing house can then read and reference a digital image of the check being processed from the image storage device.

It will be further noted that if the threshold values cannot be calculated for some reason, such as when the background pattern is dark, the image capturing process can be terminated and an error process run, or the gray scale image data can be sent directly to the host computer without thresholding.

Figure 9:
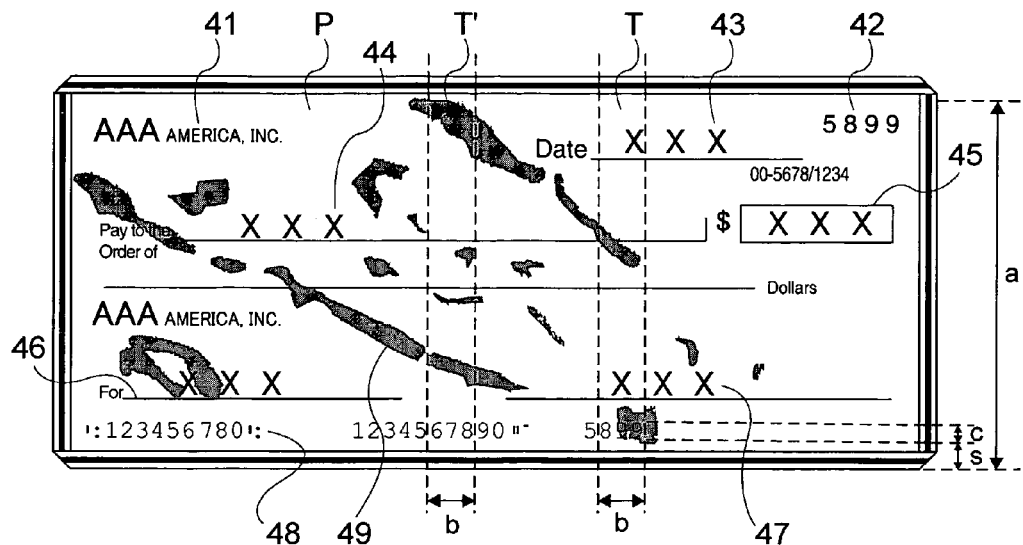
FIG. 9 is a plan view of a check.

FIG. 9 is a plan view of a check. The payer 41, serial check number 42, date issued 43, payee 44, payment amount 45, memo 46, account holder signature 47, and magnetic ink characters 48 are either preprinted on the blank checks or written or printed on the check P at the time the check P is used. Except for the check number 42, magnetic ink characters 48 and other information preprinted on a blank check P, the control process can be written so that all other check information can be printed or written onto the check after the provisional scanning step described above. The background 49 of the check P is also not limited to monochrome patterns, and checks with various pictures or patterns containing various colors and color densities in the background 49 are widely used. The check P shown in FIG. 9 is an example of this type, and while not clearly shown in FIG. 9 the background of this check P is a pattern of darker gray gradations over a light gray base.

Figure 10:
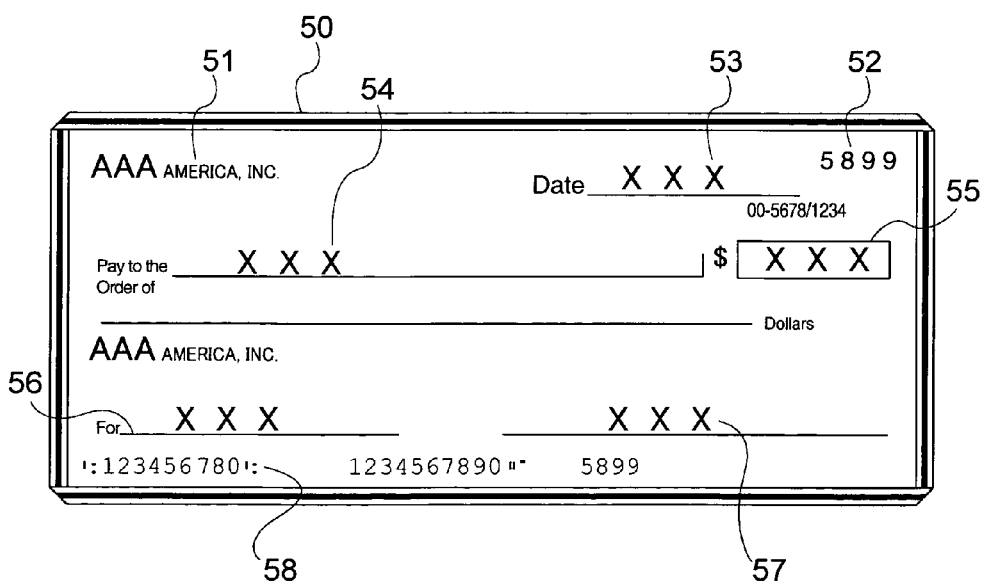
FIG. 10 shows digital image data captured from the check in FIG. 9.

FIG. 10 shows the digital image typically extracted from the check P shown in FIG. 9. In the digital image data 50 obtained by a binarization process converting each pixel in the gray scale image of the check P to either white (255) or black (0), each pixel in the background 49 is converted to white, thereby effectively removing the background pattern. Reference numerals 51 to 58 in FIG. 10 correspond to reference 41 to 48 in FIG. 9.

The scanning process is described next.

Figure 11:
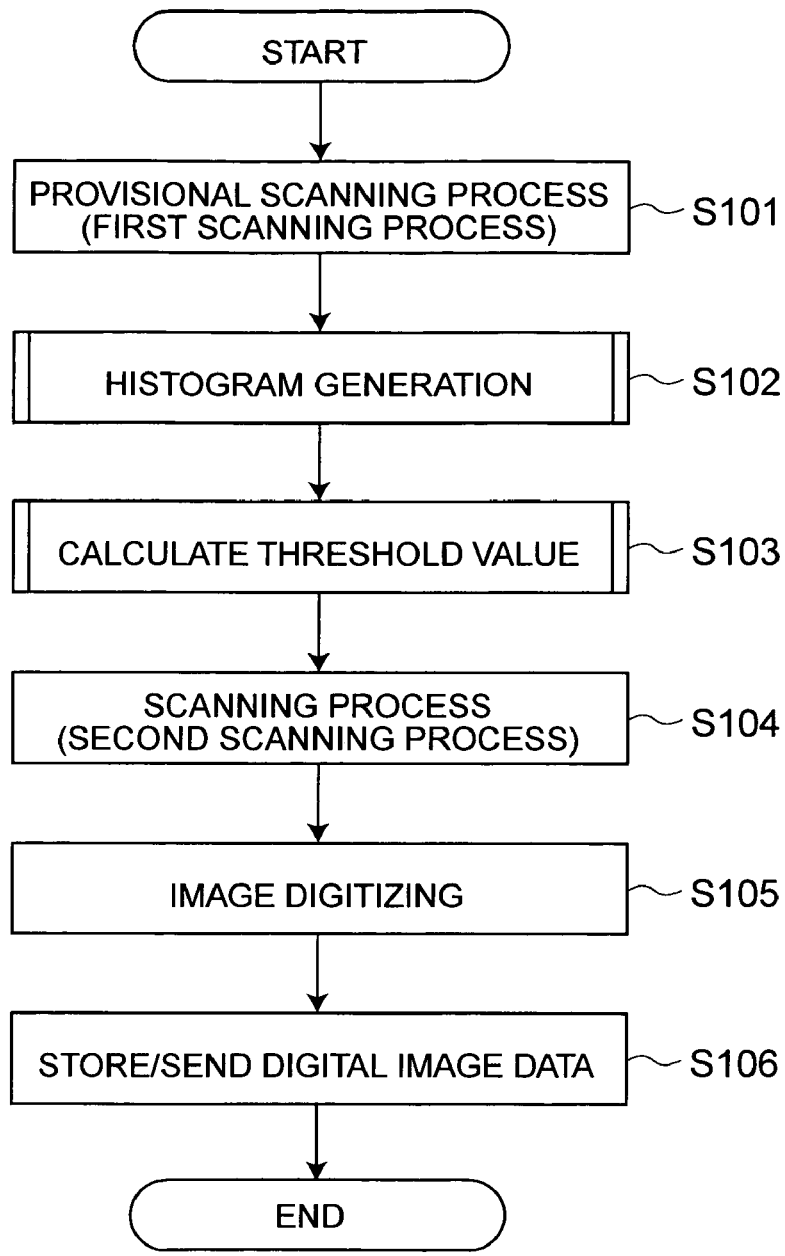
FIG. 11 is a flow chart of scanning process control.

FIG. 11 is a flow chart of the scanning process control steps. The first step is to capture a gray scale image of the provisional scanning area T (FIG. 9) from part of the check by a provisional scanning operation (first scanning operation) (S101). A histogram is then generated from the captured gray scale image data. The histogram generating process is described in detail further below.

The threshold values for the digitizing process are then calculated from the histogram (S103). A gray scale image of the entire check face is then captured by a final scanning operation (second scanning operation) (S104), and the digital image data is generated by a digitizing process using the calculated threshold values (S105). The resulting digital image data is temporarily stored in the image storage unit 21 and sent to the host computer (S106).

It should be noted that the provisional scanning process (S101) is not limited to being run within the scanning process (S522), and can be run simultaneously to the MICR process (S506) or the scanning start position process (S518). It is particularly preferable to provisionally scan the check P either during the MICR process (S506) before the front printing process (S516), or after the MICR process (S506) but before the front printing process (S516), in order to more accurately extract image features from the background 49 of the check.

The histogram generation process is described next.

Figure 12:
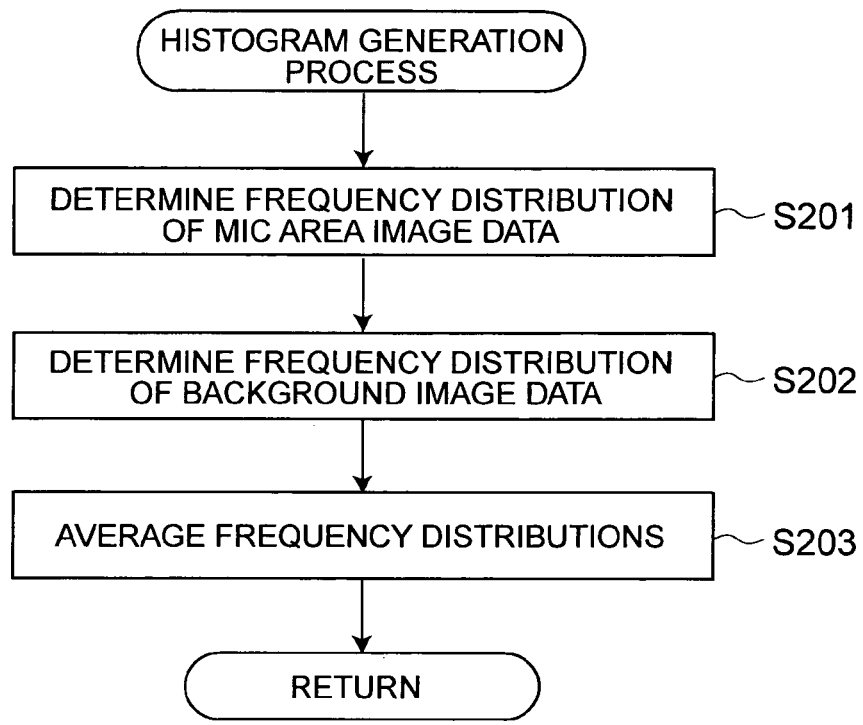
FIG. 12 is a flow chart of the control steps in the histogram generation process.

FIG. 12 is a flow chart of the control steps in the histogram generation process. The first step is to apply the frequency distribution process 33 to the MIC area image data 31 in the image data captured by the provisional scanning operation to generate a histogram of the MIC text (S201). A histogram of the background is also created by applying the frequency distribution process 33 to the background image data 32 in the image data captured by the provisional scanning step (S202). The averaging process 34 is then applied to the MIC histogram and the background histogram (S203). This averaging process calculates the average of a pixel i and the four pixels before and after pixel i (a total of nine pixels), and assigns the resulting average as the value of pixel i. More specifically, the average of pixel (i−4), pixel (i−3), pixel (i−2), pixel (i−1), pixel i, pixel (i+1), pixel (i+2), pixel (i+3), and pixel (i+4) is used as the value of pixel i.

An example of provisional scanning areas T (T') is shown in FIG. 9. As shown in FIG. 9 these provisional scanning areas T (T') contain both magnetic ink characters 48 and background 49. The magnetic ink character recording area 127 is standardized according to the type of check (personal check or business (voucher) check), and where the magnetic ink characters 48 are printed can therefore be identified.

More specifically, the location where the magnetic ink characters are printed can be determined based on the height (s,c) in the direction of the short side of the check and the length of the magnetic ink character 48 string derived from the output signals of the magnetic head 117. This height (s,c) (that is, the length in the heightwise direction of the magnetic ink characters 48) is defined by the check printing standard, and the length of the MIC string is derived from the output signals of the magnetic head 117 because the number of magnetic ink characters is variable. It should be noted that the check P is inserted into the check processing apparatus 110 leading with the right side edge of the check, and the magnetic ink characters 48 are therefore read from the right-most digit to the left-most digit.

The provisional scanning area T is an area with a specific width (b) in the form transportation direction from the position where the first magnetic ink character is detected. The other provisional scanning area T' is an area with the same specific width (b) in the transportation direction starting from a point separated a specific distance in the transportation direction from where the first magnetic ink character is detected. The provisional scanning areas T (T') could alternatively be set to areas including text preprinted on other specified areas instead of using the magnetic ink characters 48.

Figure 13:
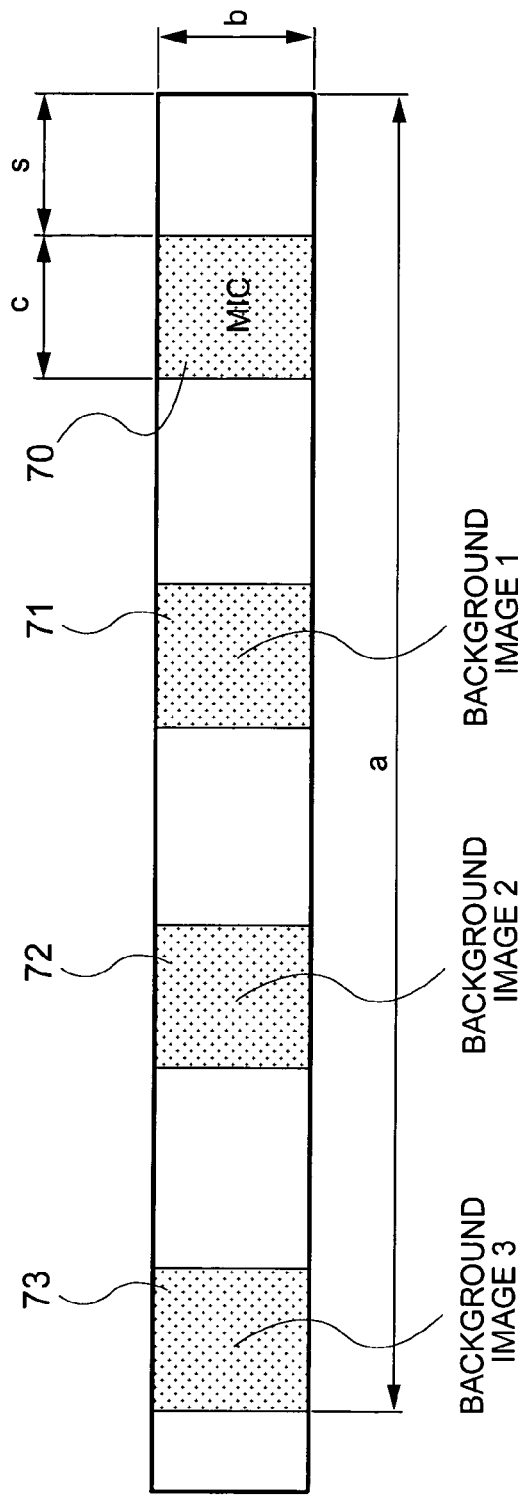
FIG. 13 shows the concept of the provisional scanning area.

FIG. 13 shows the concept of the provisional scanning area. In this example MIC area 70 and three background areas 71 to 73 from the provisional scanning area T are used as the areas (specified areas) for histogram generation. The MIC area 70 and three background areas 71 to 73 are all the same size. In this example they are 8 mm (b)×5 mm (c). In order to set appropriate threshold values, these specified areas preferably contain the smallest possible number of pixels containing magnetic ink characters 48 and background 49. It is thus possible to use only part of the image data in provisional scanning areas T (T') to set the threshold values, or all image data in the scanning areas T (T') could be used. If only part of the image data in provisional scanning areas T (T') is used the required processing time and storage space can be reduced.

Figure 14:
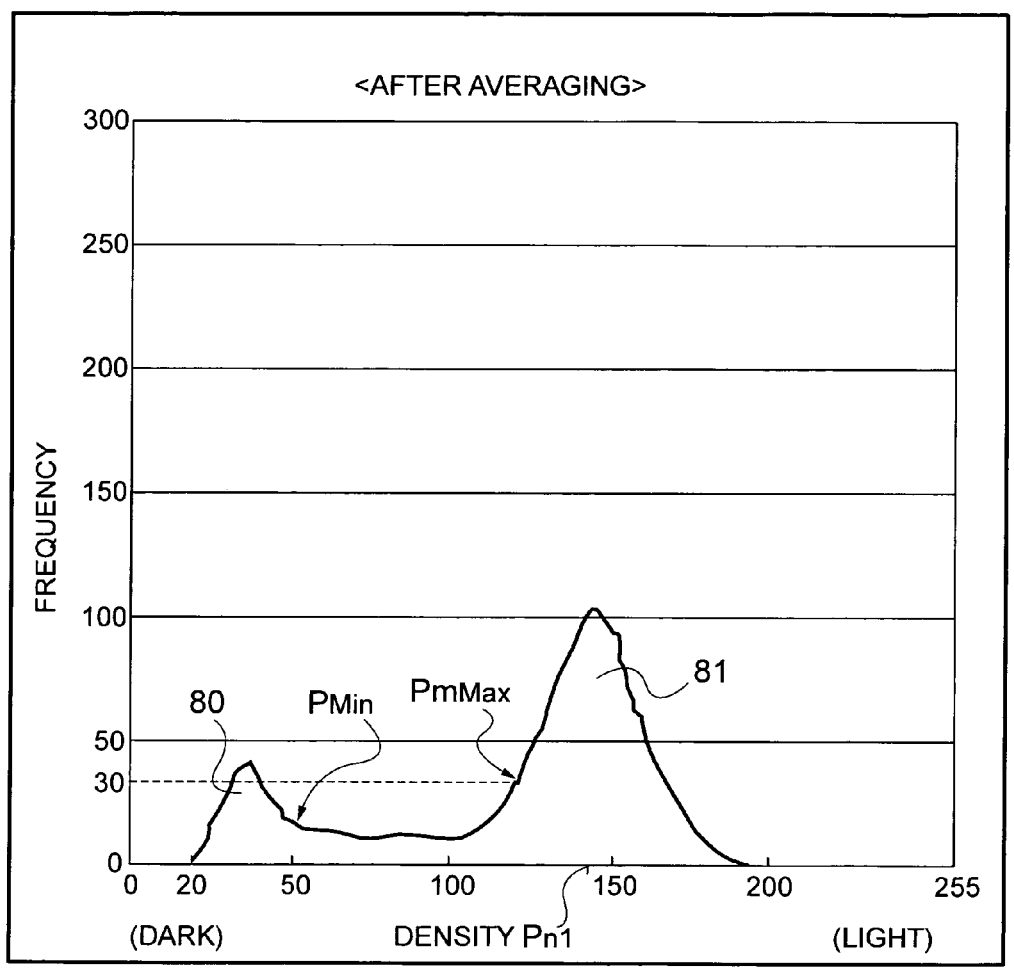
FIG. 14 is a histogram of the MIC area.
Figure 15:
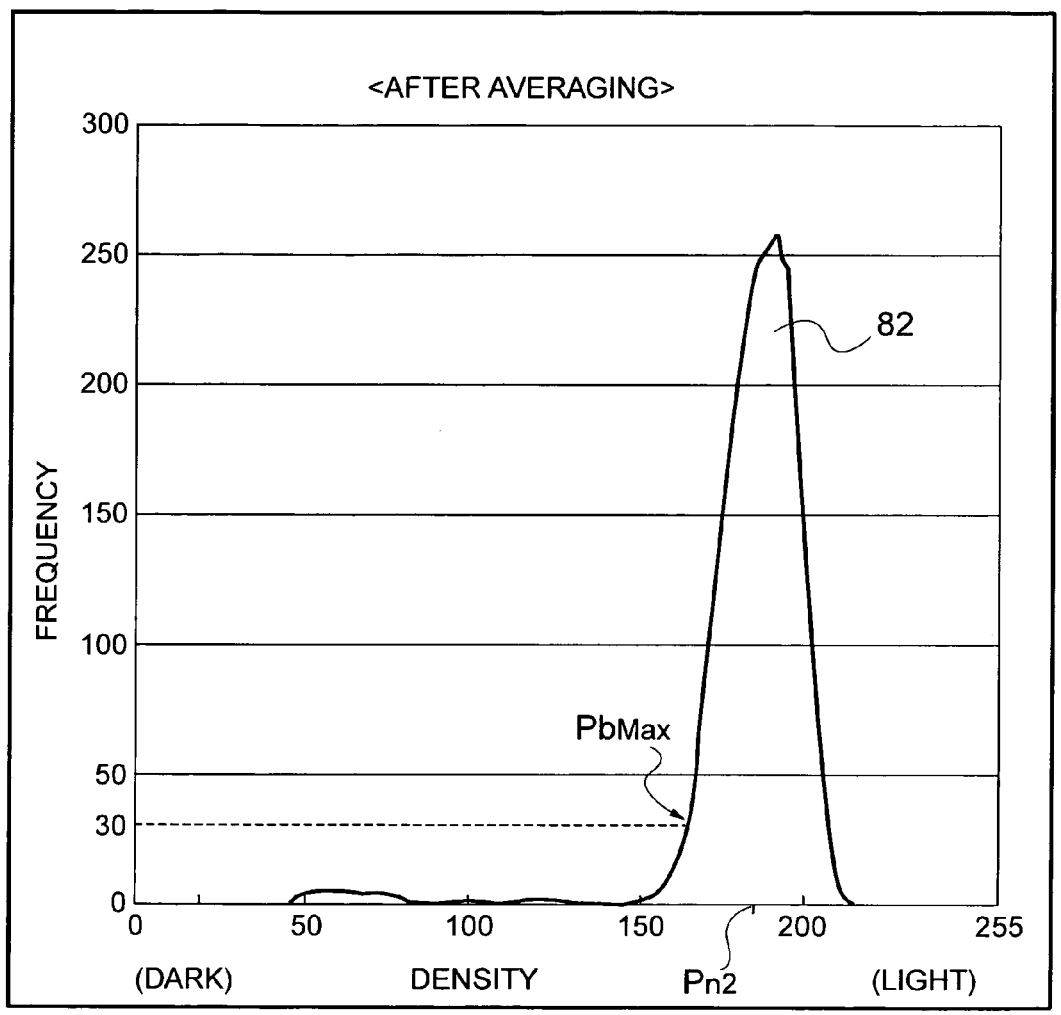
FIG. 15 is a histogram of the background.
Figure 16:
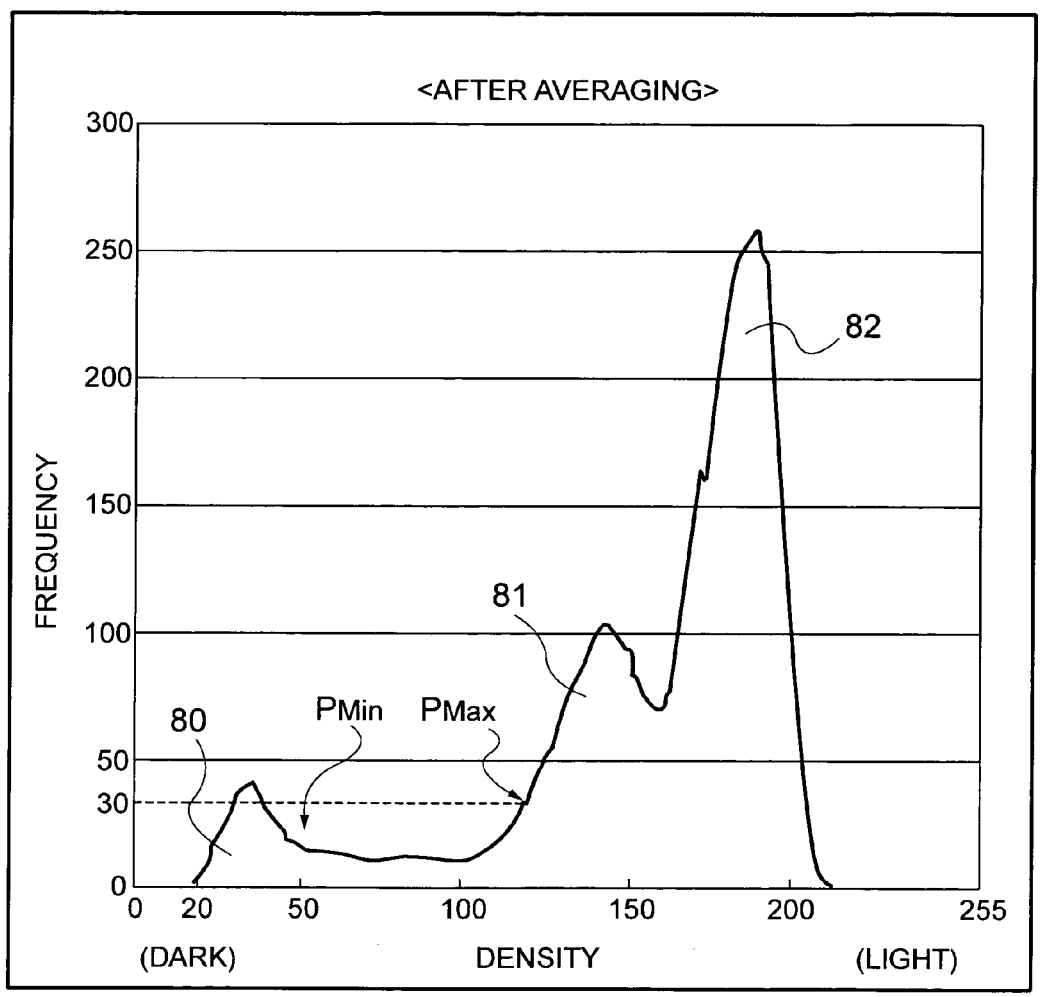
FIG. 16 is a combined histogram of the MIC area and background.

FIG. 14 is a histogram of the MIC area 70 produced by the histogram generation process (S201, S203), and FIG. 15 is a histogram of all background areas 71 to 73 produced by the histogram generation process (S202, S203). FIG. 16 is a histogram combining the histogram of the MIC area 70 and the histogram of all background areas 71 to 73, and is provided for descriptive purposes. It should be noted that a single histogram is produced for each of the background areas 71 to 73 and these individual histograms are then merged to produce the background area histogram shown in FIG. 15. The first peak 80 between density levels 20 to 60 corresponds to the set of pixels forming the magnetic ink characters 48 in MIC area 70, and the second peak 81 from density levels 100 to 160 corresponds to the set of pixels representing the background 49 in the MIC area 70. Third peak 82 from density levels 160 to 210 shows the set of pixels representing the background 49 in background areas 71 to 73.

The threshold value calculation process is described next.

Figure 17:
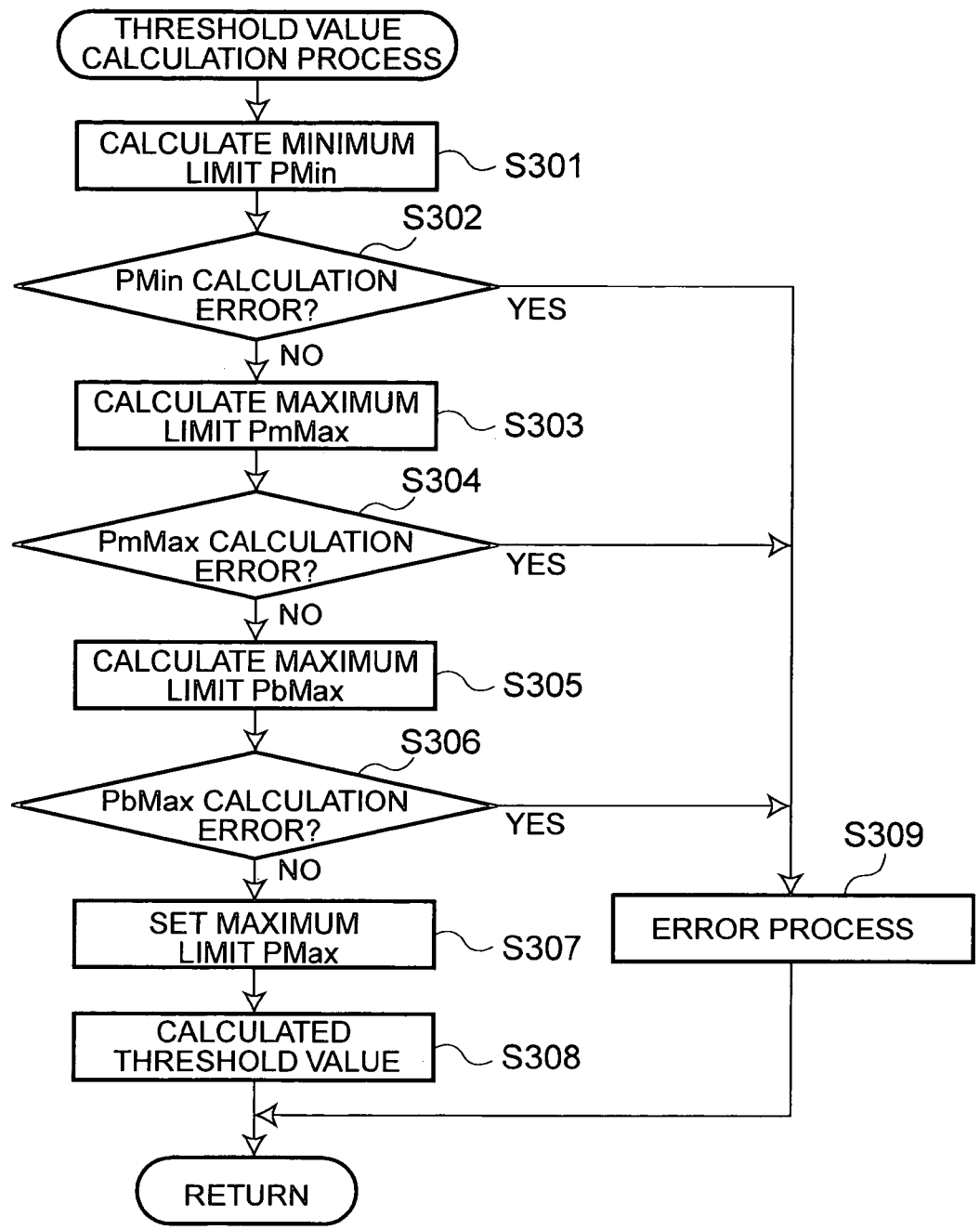
FIG. 17 is a flow chart showing the control steps in the threshold value calculation process.

FIG. 17 is a flow chart showing the control steps in the threshold value calculation process. The threshold values are used to separate text from background and must therefore be set between the density of the magnetic ink characters 48 and the density of the background 49. The limit on the dark side (bottom limit) and the limit on the light side (top limit) are referred to as the minimum limit PMin and the maximum limit PMax, respectively.

The minimum limit PMin of the threshold value is first calculated from the histogram of the MIC area 70 (S301). The minimum limit PMin must be lighter than the density of the magnetic ink characters 48, and minimum limit PMin is therefore calculated based on the density of the magnetic ink characters 48 as further described below. If minimum limit PMin cannot be determined (S302 returns yes), an error handling process is run (S309).

MIC maximum limit PmMax, which is the highest lightness limit in the MIC area 70, is then obtained from the histogram of the MIC area 70 (S303). The MIC maximum limit PmMax is the limit at which it will not be possible to separate the background 49 from the magnetic ink characters 48 if the threshold value is set any lighter. If the MIC maximum limit PmMax cannot be determined (S304 returns yes), an error handling process is run (S309).

The background maximum limit PbMax, which is the highest limit in background areas 71 to 73, is then similarly obtained from the histograms of background areas 71 to 73 (S305). The background maximum limit PbMax is the limit at which it will not be possible to separate the background 49 from the magnetic ink characters 48 in the MIC area 70 if the threshold value is set any lighter. If the background maximum limit PbMax cannot be determined (S306 returns yes), an error handling process is run (S309).

The maximum limit PMax of the threshold value is determined next (S307). The smaller of MIC maximum limit PmMax and background maximum limit PbMax is made maximum limit PMax.

The threshold value is then calculated based on minimum limit PMin and maximum limit PMax.

An example of the averaging process is described next.

A preferred embodiment of the averaging process (S203) is described next. The total pixel count Y captured by provisional scanning can be obtained from $Y=f(0)+f(1)+\ldots f(255)$ where pixel count y of density n (n=0, 1, ... 255) is y=f(n).

The total pixel count Ym in MIC area 70 is $Ym=fm(0)+fm(1)+\ldots fm(255)$.

The total pixel counts Yb for the background areas 71 to 73 are $Yb1=fb1(0)+fb1(1)+\ldots +fb1(255)$ $Yb2=fb2(0)+fb2(1)+\ldots +fb2(255)$ $Yb3=fb3(0)+fb3(1)+\ldots +fb3(255)$.

The total pixel count Y is the sum of all pixels in the MIC area 70 and all pixels in background areas 71 to 73, and can therefore be written as $Y=Ym+Yb$ $Yb=Yb1+Yb2+Yb3$.

The pixel data (density values) of the MIC area 70 are important in calculating the minimum limit of the threshold value, but the total pixel count in the MIC area 70 is small compared with the total pixel count in the background areas 71 to 73. The pixel data from the MIC area 70 is therefore weighted in order to calculate a more appropriate minimum limit PMin. An averaged histogram is therefore generated for the MIC area 70 after weighting. If a weighting of 2 is used, the pixel count yv of weighted density n for MIC area 70 is $yv=2fm(n)=fmv(n)$ the total pixel count Ymv of the weighted MIC area 70 is $Ymv=fmv(0)+fmv(1)+\ldots +fmv(255)$ and the weighted total pixel count Yt is $Yt=Ymv+Yb$.

As noted above the averaging process is a process for averaging the pixel count of each density level based on the number of pixels of a particular density before and after each target pixel. To average the pixel count fmv(n) of level n in MIC area 70 using k pixels of some level before and after each pixel, the average pixel count fma(n) of level n can be expressed as shown in equation 1. Note that this example uses four pixels before and after a pixel of level n.

$$fma(n) = \sum_{k=-4}^{4} fv(n+k)/9 \quad (4[n[251]) \quad \text{EQUATION 1}$$

$fma(n) = 0 \ (n<4, n>251)$

The average level n pixel count fba(n) in background areas 71 to 73 can likewise be denoted as shown in equation 2.

$$fba(n) = \sum_{k=-4}^{4} fb(n+k)/9 \quad (4[n[251]) \quad \text{EQUATION 2}$$

$fba(n) = 0 \ (n<4, n>251)$

This averaging process removes noise from the histogram and can therefore accurately extract density levels characteristic of the image.

Calculation of minimum limit PMin is described next.

In this example pixels are counted in the histogram of MIC area 70 from level n=0 and minimum limit PMin is set at the point where the total number of pixels counted is 10% of the total pixel count. The relative frequency r(n) (=(number of level n pixels)/(total pixel count)) in MIC area 70 is therefore calculated using the equation $r(n)=fmv(n)/Ymv$.

The highest value of n where r(n) satisfies the following equation is then set as minimum limit PMin.

$$\sum_{k=0}^{255} r(k) < 0.1 \quad \text{EQUATION 3}$$

It will be noted that minimum limit PMin is set to the level at which the pixel count is 10% of the total pixel count in this example and that this value is an experiential value determined from tests, but minimum limit PMin can be otherwise appropriately set.

Calculation of MIC maximum limit PmMax is described next.

MIC maximum limit PmMax determines the upper limit for converting pixels in the background 49 of MIC area 70 to white. The threshold value must therefore be set so that pixels in second peak 81 shown in FIG. 14 are also converted to white.

The peak density Pn1 of second peak 81 is approximately 145, and the pixel count (frequency) of each level n in the valley between peaks 80 and 81 is 10 to 15. By checking the pixel count of each density level from peak density Pn1 to the dark side (that is, toward the first peak 80 in the magnetic ink characters 48) and selecting level n having a pixel count of less than 30, it should be possible to remove the pixels constituting the background 49, and MIC maximum limit PmMax is therefore set to this level n. This pixel count of 30 for setting the MIC maximum limit PmMax was experimentally determined, and can be appropriately set otherwise. Similarly to the pixel count of 30 used in this example it is also possible to calculate from the histogram a pixel frequency that does not include most density levels of the pixels in the background 49 and can be differentiated from the pixel count in the valley between peaks 80 and 81.

MIC maximum limit PmMax can be determined as follows. If there are 2560 pixels each in MIC area 70 and background areas 71 to 73 shown in FIG. 13 and the MIC area 70 data is weighted by a factor of 2, the total pixel count in the MIC area 70 is 2560×2=5120. To determine PmMax, the pixel count fma(n) of each level n from peak density Pn1 to the low level n side is counted, and the level n at which the pixel count is less than 0.58% (=30/5120) of total pixel count Ymv of MIC area 70 is set to MIC maximum limit PmMax. This means that PmMax is set to the first value k where $fma(k)/Ymv<0.58\% \ (k=Pn1, Pn1-1, Pn1-2, \ldots )$.

Calculation of background maximum limit PbMax is described next.

Background maximum limit PbMax can be calculated the same way as MIC maximum limit PmMax. More specifically, the peak density Pn2 of third peak 82 derived from the set of pixels forming the background 49 in background areas 71 to 73 is detected, the number of pixels of each level n where level n decreases from peak density Pn2 is counted, and the level n where pixel count n<30 is set as background maximum limit PbMax.

The total pixel count of background areas 71 to 73 is 2560×3=7680. The pixel count fba(n) of each level n where level n decreases from peak density Pn2 is counted in turn from peak density Pn2, and the level n where the pixel count is less than 0.39% (=30/7680) of total pixel count Yb of background areas 71 to 73 is set to the background maximum limit PbMax. PbMax is set to the first value k where $$fba(k)/Yb < 0.39\% \; (k = Pn2, Pn2-1, Pn2-2, \ldots).$$

The smaller of MIC maximum limit PmMax and background maximum limit PbMax is set as maximum limit PMax.

Calculation of the threshold value R is described next.

Threshold value R is obtained using the following equation based on minimum limit PMin and maximum limit PMax.

$$R = P\text{Min} + (P\text{Max} - P\text{Min}) \times 0.58$$

That is, the threshold value is calculated to be a value closer to Pmin than the intermediate of minimum limit PMin and maximum limit PMax. This is to remove as much of the background pattern as possible. It should be noted that the coefficient 0.58 used in this example was determined experimentally, and can be appropriately set otherwise.

A second example for calculating minimum limit PMin and maximum limit PMax is discussed as follows, first with respect to creating an averaged histogram.

The histograms of the MIC area 70 and background areas 71 to 73 are averaged. The basic concept of this averaging process is as described above, but in this example the average density n is obtained using the seven pixels before and after the target pixel.

$$fma(n) = \sum_{k=-7}^{7} fv(n+k)/15 \; (7[n[248) \qquad \text{EQUATION 4}$$

$$fma(n) = 0 \; (n < 7, n > 248)$$

$$fba(n) = \sum_{k=-7}^{7} fb(n+k)/15 \; (7[n[248) \qquad \text{EQUATION 5}$$

$$fba(n) = 0 \; (n < 7, n > 248)$$

A histogram for MIC area 70 and background areas 71 to 73 is then compiled based on the average pixel counts fma(n) and fba(n) for each density level.

Calculation of the minimum limit PMin is described next.

The slope s of the histogram for MIC area 70 is obtained next using the following equation where x is the data interval and y is the averaged frequency (pixel count).

$$s(i) = \frac{5 \sum_{k=-2}^{2} x(i+k)y(i+k) - \left(\sum_{k=-2}^{2} x(i+k)\right)\left(\sum_{k=-2}^{2} y(i+k)\right)}{5 \sum_{k=-2}^{2} (x(i+k))^2 - \left(\sum_{k=-2}^{2} x(i+k)\right)^2} 9[i[246 \qquad \text{EQUATION 6}$$

Using this slope s, the density satisfying the following conditions 1 to 4 is set as the minimum limit PMin.

Condition 1 s(i)×s(i+1) [0
Condition 2 s(i+1)<0
Condition 3 s(i)<0

The point satisfying conditions 1 to 3 is the point where slope s changes from negative to positive.

Condition 4 is that the cumulative relative frequency Tr1 totalling relative frequency r(n) from n=0 is at least 8% of the total where the ratio (relative frequency) r(n) of the pixel count of each density n to the total pixel count of the MIC area 70 is obtained using the next equation.

Condition 4 r(n)=fmv(n)/Ymv $$Tr1 = \sum_{k=0}^{i} r(K)(0.08 \qquad \text{EQUATION 7}$$

The reason for providing the fourth condition that cumulative relative frequency Tr1 is 8% is described next. A density level satisfying conditions 1 to 3 may be found before or at the first peak 80 of the histogram representing magnetic ink characters 48 if, for example, there is a higher density area than magnetic ink characters 48 because of soiling or other reason or the density of the magnetic ink characters 48 is not uniform. Therefore, even if there is a density level satisfying conditions 1 to 3, that level will not be set to minimum limit PMin if the pixel count for that level does not also exceed 8% of the dark pixels represented in the histogram. What percentage the cumulative relative frequency Tr1 is set to can be freely determined from experience or testing, for example.

Figure 18:
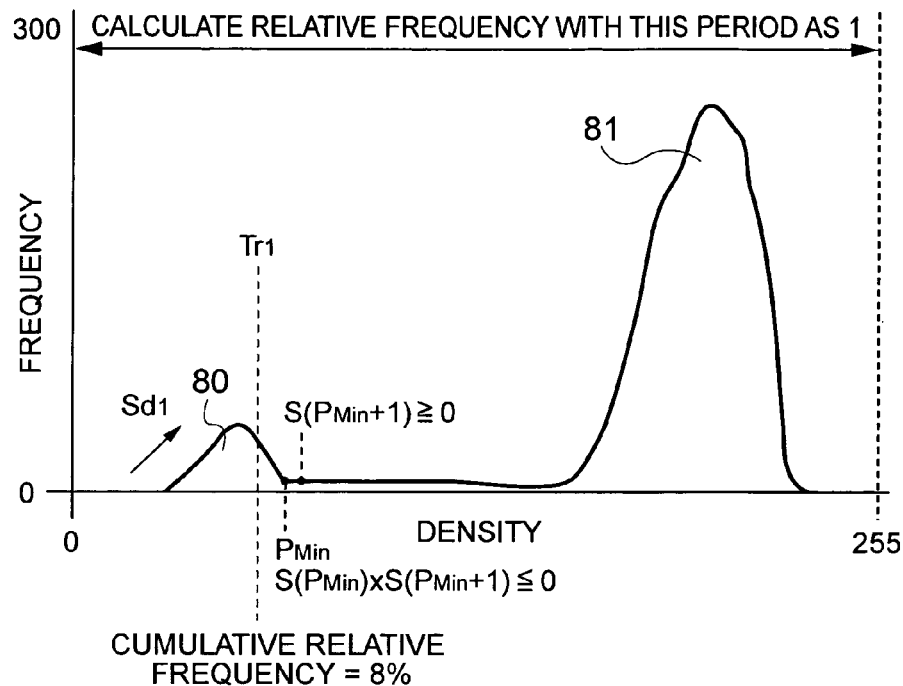
FIG. 18 is a histogram of MIC area showing minimum limit PMin and cumulative relative frequency Tr1 by way of example.

FIG. 18 is a histogram of MIC area 70 showing minimum limit PMin and cumulative relative frequency Tr1 by way of example. Arrow sd1 in the figure indicates the direction (order) in which points satisfying conditions 1 to 4 are searched. Because condition 4 is met after Tr1, slope s<0 at Pmin−1, and slope s=0 at Pmin, conditions 1 to 3 are also satisfied and Pmin is thus set.

Calculation of the MIC maximum limit PmMax is described next.

Figure 19:
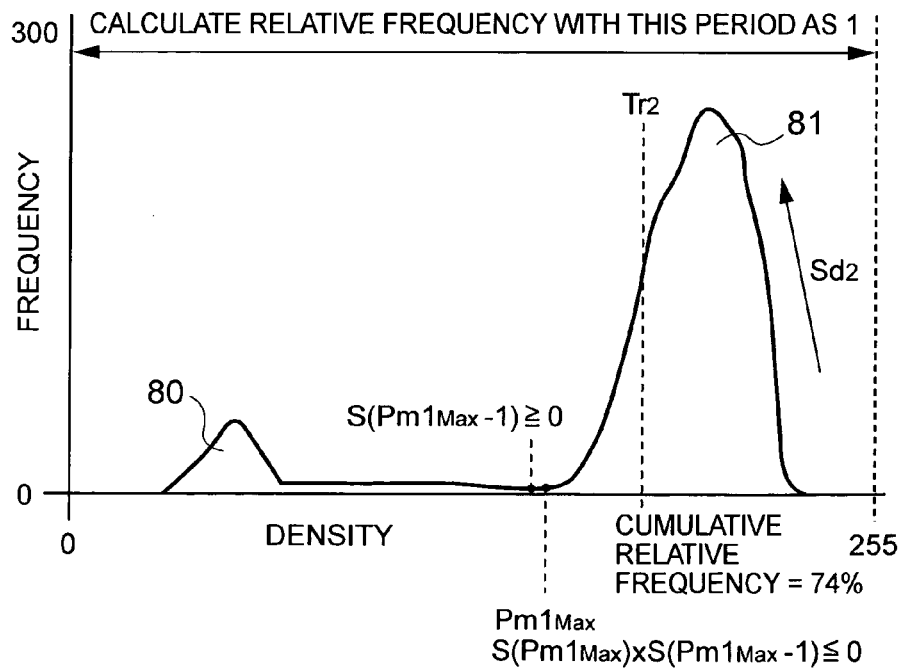
FIG. 19 is a histogram of MIC area showing a provisional MIC maximum limit Pm1Max and cumulative relative frequency Tr2.

FIG. 19 is a histogram of MIC area 70 showing a provisional MIC maximum limit Pm1Max and cumulative relative frequency Tr2. In this example arrow sd2 indicates the direction in which provisional MIC maximum limit Pm1Max is detected, and Tr2 indicates a cumulative relative frequency of 74%.

The first step is to calculate the slope s(i) of the histogram based on equation 6 above in the same way as for minimum limit PMin. As indicated by arrow sd2 in FIG. 19, the point where the following conditions 1 to 4 are satisfied is found by searching from right to left, that is, opposite the search direction for minimum limit PMin, and used as the provisional MIC maximum limit Pm1Max.

Condition 1 s(i)×s(i−1)[0
Condition 2 s(i−1)[0
Condition 3 s(i−1)>0

The point satisfying conditions 1 to 3 is the point where slope s changes from negative to positive, and except for the search direction being opposite is the same as when determining minimum limit PMin.

Condition 4 is that the cumulative relative frequency Tr2 totalling relative frequency r(n) from n=255 is at least 74% of the total where the ratio (relative frequency) r(n) of the pixel count of each density n to the total pixel count of the MIC area 70 is obtained using the next equation.

Condition 4 r(n)=fmv(n)/Ymv $$Tr2 = \sum_{k=255}^{i} r(k) \rangle 0.74 \qquad \text{EQUATION 8}$$

The reason for providing the fourth condition that cumulative relative frequency Tr2 is 74% of the total is to prevent setting provisional MIC maximum limit Pm1Max before or at the second peak 81 of the histogram representing background 49 even if conditions 1 to 3 are satisfied. What percentage the cumulative relative frequency Tr2 is set to can be freely determined from experience or testing, for example.

The provisional MIC maximum limit Pm1Max is thus set as described above by searching the histogram sequentially from the right side, that is, the side and direction opposite those used when setting minimum limit PMin, as indicated by arrow sd2 in FIG. 19 to find and set to provisional MIC maximum limit Pm1Max the point at which all conditions 1 to 4 are satisfied.

The density level closest to Pm1Max that satisfies the following condition 5 is then searched from provisional MIC maximum limit Pm1Max and set as the true MIC maximum limit PmMax.

Condition 5 s(i)<1(Pm1Max[i [255)

Figure 20:
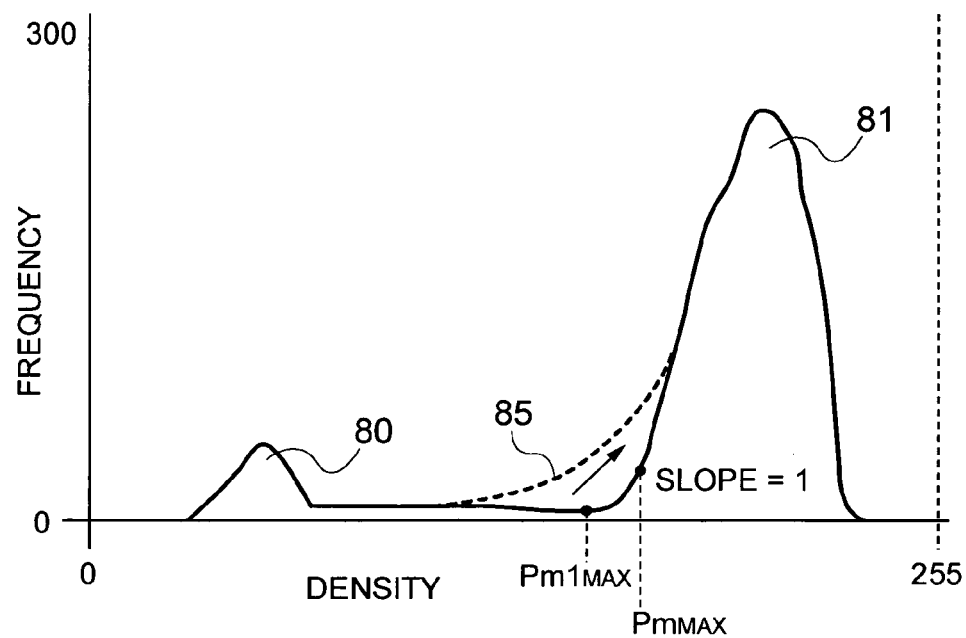
FIG. 20 is a histogram showing the relationship between the provisional MIC maximum limit Pm1Max and the true MIC maximum limit PmMax.

FIG. 20 is a histogram showing the relationship between the provisional MIC maximum limit Pm1Max and the true MIC maximum limit PmMax. The true MIC maximum limit PmMax is set to the point where slope s(i) is greater than or equal to 1 after obtaining provisional MIC maximum limit Pm1Max as described above because if a gradual slope s(i) continues as indicated by the dotted line 85 in FIG. 20, it is not appropriate to set the value of the provisional MIC maximum limit Pm1Max as the true MIC maximum limit PmMax. It will be further noted that slope s(i)<1 in this example, that this is an experimentally determined value, and the slope could be less than or equal to 1 or greater than or equal to 1 insofar as it appropriately represents the lower limit of the pixel set representing the background 49.

Calculation of the maximum limit PMax is described next.

Background maximum limit PbMax is obtained using the same method as MIC maximum limit PmMax, and as in the first example above the smaller of MIC maximum limit PmMax and background maximum limit PbMax is set to maximum limit PMax.

As will be known from the above, the present invention dynamically sets a threshold value used to convert a gray scale image of the check to digital image data based on a part of the image considered characteristic of check features. It is therefore possible to obtain digital image data from which the magnetic ink character data and textual information written or printed on the check face and needed for electronic payment can be accurately determined.

Although the present invention has been described in connection with the preferred embodiments thereof with reference to the accompanying drawings, it is to be noted that various changes and modifications will be apparent to those skilled in the art. For example, the present invention shall not be limited to processing checks and can also be applied to other types of negotiable instruments. Such changes and modifications are to be understood as included within the scope of the present invention as defined by the appended claims, unless they depart therefrom.

What is claimed is:

1. A negotiable instrument processing apparatus comprising:
    an image reading unit that scans a negotiable instrument and outputs an image;
    a threshold value determination unit that sets a threshold value used for digitizing an image, the threshold value based on a density level frequency distribution of gray scale image data being obtained from a first scanning area of the negotiable instrument when the image data reading unit scans the first scanning area,
    the first scanning area containing part of a printed text area where text is printed on the negotiable instrument and part of a background of the negotiable instrument; and
    a digital conversion processing unit that digitizes and converts at least one image to digital image data based on the threshold value set by the threshold value determination unit,
    the at least one image being obtained from a second scanning area of the negotiable instrument when the image reading unit scans the second scanning area.

2. The apparatus of claim 1, wherein the first scanning area comprises a first area containing the part of the printed text area, a second area containing the part of the background, and the first and second areas are noncontiguous.

3. The apparatus of claim 2, wherein the second area includes multiple sections, each section containing part of the background.

4. The apparatus of claim 3, wherein the threshold value determination unit determines the threshold value based on a density level frequency distribution after weighting the gray scale image data in the first area.

5. The apparatus of claim 1, wherein the printed text area is a magnetic ink character printing area where magnetic ink characters are printed.

6. The apparatus of claim 5, further comprising a magnetic head that reads magnetic ink characters; and
    the threshold value determination unit detects a magnetic ink character printing area based on output signals from the magnetic head, and sets the first scanning area based on the magnetic ink character printing area.

7. The apparatus of claim 1, wherein the threshold value determination unit applies an averaging process to the density level frequency distribution and determines the threshold value based on the averaged density level frequency distribution.

8. The apparatus of claim 1, wherein the threshold value set by the threshold value determination unit is a lightness value for generating the digital image data that includes the text but substantially excludes the background.

9. The apparatus of claim 1, wherein the threshold value determination unit identifies a first peak representing the text and an adjacent second peak representing the background in the density level frequency distribution, and sets the threshold value between the first and second peaks.

10. A negotiable instrument processing method comprising the following steps:
(a) scanning a first scanning area of a negotiable instrument and generating gray scale image data,
the first scanning area containing part of a printed text area where text is printed on the negotiable instrument and part of a background of the negotiable instrument;
(b) generating a density level frequency distribution of the gray scale image data;
(c) determining a threshold value for digitizing an image based on the density level frequency distribution;
(d) scanning a second scanning area of the negotiable instrument to obtain an image; and
(e) digitizing the image obtained in step (d) based on the threshold value determined in step (c) to generate digital image data.

11. The method of claim 10, wherein the first scanning area comprises a first area containing the part of the printed text area, a second area containing the part of the background, and the first and second areas are noncontiguous.

12. The method of claim 11, wherein the second area includes multiple sections, each section containing part of the background.

13. The method of claim 12, wherein step (b) generates a density level frequency distribution after weighting the gray scale image data in the first area; and
step (c) determines the threshold value based on the weighted density level frequency distribution.

14. The method of claim 10, wherein the printed text area is a magnetic ink character printing area where magnetic ink characters are printed.

15. The method of claim 14, further comprising the following steps:
(f) reading the magnetic ink characters using a magnetic head; and
(g) detecting the magnetic ink character printing area based on output signals from the magnetic head, and setting the first scanning area based on the magnetic ink character printing area.

16. The method of claim 10, wherein step (b) generates the density level frequency distribution after applying an averaging process; and
step (c) determines the threshold value based on the averaged density level frequency distribution.

17. The method of claim 10, wherein the threshold value determined by step (c) is a lightness value for generating the digital image data that includes the text but substantially excludes the background.

18. The method of claim 10, wherein step (c) identifies a first peak representing the text and an adjacent second peak representing the background in the density level frequency distribution, and sets the threshold value between the first and second peaks.

19. The method of claim 10, further comprising a step (h) of printing on the negotiable instrument, step (h) being executed after step (a) and before step (d).

20. A negotiable instrument processing method comprising the following steps:
(a) scanning a first scanning area of a negotiable instrument and generating gray scale image data,
the first scanning area containing part of a printed text area where text is printed on the negotiable instrument and part of a background of the negotiable instrument;
(b) generating a density level frequency distribution of the gray scale image data;
(c) determining a threshold value for digitizing an image based on the density level frequency distribution; and
(d) digitizing an image of a second scanning area of the negotiable instrument based on the threshold value determined in step (c) to generate digital image data.

* * * * *